United States Patent
Grundei

[11] Patent Number: 6,015,030
[45] Date of Patent: Jan. 18, 2000

[54] VIBRATION DAMPER WITH VARIABLE DAMPING FORCE

[75] Inventor: Manfred Grundei, Niederwerrn, Germany

[73] Assignee: Mannesmann Sachs AG, Schweinfurt, Germany

[21] Appl. No.: 08/924,377

[22] Filed: Sep. 5, 1997

[30] Foreign Application Priority Data

Sep. 12, 1996 [DE] Germany ............................ 196 37 095

[51] Int. Cl.⁷ .................................................. B60G 11/26
[52] U.S. Cl. ........................ 188/266.2; 188/318; 267/218; 267/256; 267/191
[58] Field of Search ................................ 188/299.1, 315, 188/313, 319.2, 318, 322.13, 266.1–266.6, 297, 321.11, 300, 322.14; 280/5.508, 6.157, 6.159, 6.15, 124.06, 124.101, 124.102, 214.106, 124.107, 124.103, 5.513, 6.16, 124.104, 124.105, 124.16, 124.162, 125.128, 124.163; 267/188–191, 223, 221, 218, 255, 123, 67, 68

[56] References Cited

U.S. PATENT DOCUMENTS

| | | |
|---|---|---|
| 1,148,590 | 8/1915 | Kenevel . |
| 1,151,350 | 8/1915 | Fox . |
| 1,367,668 | 2/1921 | Paxton . |
| 1,454,393 | 5/1923 | Loyd et al. . |
| 1,954,196 | 4/1934 | Breer ..................................... 188/299.1 |
| 2,021,043 | 11/1935 | Bedford et al. . |
| 2,085,454 | 6/1937 | Mercier . |
| 2,718,285 | 9/1955 | Largay ................................. 188/299.1 |
| 3,246,905 | 4/1966 | Morgan . |
| 3,447,796 | 6/1969 | Van Wilsen . |
| 3,891,241 | 6/1975 | Bainbridge et al. . |
| 4,145,073 | 3/1979 | McLuckie et al. . |
| 4,154,461 | 5/1979 | Schnittzer . |
| 4,441,590 | 4/1984 | Giorgetti . |
| 4,529,180 | 7/1985 | Hill . |
| 4,566,555 | 1/1986 | Schlager . |
| 4,743,046 | 5/1988 | Schnittger . |
| 4,944,705 | 7/1990 | Kashima et al. . |
| 5,219,414 | 6/1993 | Yamaoka ............................. 188/322.15 |
| 5,509,512 | 4/1996 | Grundei .................................. 188/284 |
| 5,603,392 | 2/1997 | Beck ..................................... 188/266.6 |

FOREIGN PATENT DOCUMENTS 44 03 196  8/1994  Germany .

*Primary Examiner*—Douglas C. Butler
*Attorney, Agent, or Firm*—Cohen, Pontani, Lieberman & Pavane

[57] ABSTRACT

A vibration damper with variable damping force, including a cylinder, a piston and a piston rod arranged in the cylinder so as to be axially movable, an adjustable damping valve connected between the piston rod and the cylinder, and controlled as a function of a spring deflection path, a device for controlling the adjustable damping valve, and additional damping valves arranged to have a damping effect on the piston independent of the controlling device.

8 Claims, 8 Drawing Sheets

VIBRATION DAMPER WITH VARIABLE DAMPING FORCE

BACKGROUND OF THE INVENTION

1. Field of the Invention

The invention is directed to a vibration damper with variable damping force.

2. Description of the Prior Art

German reference DE 44 03 196 A1 describes, in FIGS. 3a to 3c, a vibration damper with variable damping force in which the extent of the change in the damping force depends on the spring deflection path. This is a matter of a load-dependent change in damping force which only functions in combination with a Macpherson strut or telescopic strut, since a vehicle suspension spring or stop buffer must work as an actuator. In compact vehicles, as a rule, there is a telescopic strut serving as a vibration damper. Mid- or upper-class vehicles, however, are frequently outfitted with vibration dampers constructed in the form of axle dampers. Accordingly, the vehicle suspension spring no longer works as an actuator for the load-dependent change in damping force.

Naturally, by way of alternative, an adjustable damping valve with electric control can be used, as is disclosed in FIG. 5 of the above reference. However, in vibration dampers of this constructional type there is a considerable expenditure on construction, especially with respect to safety in the event of system failure.

SUMMARY OF THE INVENTION

Accordingly, it is an object of the present invention to provide a vibration damper with a damping force adjustment which can also be used as an axle damper and which can function independent from a power supply.

Pursuant to this object, and others which will become apparent hereafter, one aspect of the present invention, resides in a vibration damper having an adjustable damping valve that is controlled via a stabilizer. The vibration damper has additional damping valves whose damping effect is independent from the control by the stabilizer. The stabilizer has a plurality of functions. First, the stabilizer detects cornering. As a further function, the stabilizer generates an adjustment path and an actuating force which can be used for controlling the damping valve control. Costly regulating devices, in particular power supplies and valve circuits, are not necessary.

In another embodiment of the invention, at least one of the additional damping valves is arranged at the piston and/or as a foot valve or bottom valve. As a result of this, the pull and push damping can be preadjusted.

Further, the stabilizer cooperates with a tension rod which influences the adjustable damping valve via a transmission member. Thus, the stabilizer need not necessarily act directly, but can also act indirectly. This provides for greater design freedom in constructing the stabilizer.

In a further embodiment, the tension rod has a free path which allows the stabilizer movement to be transmitted to the transmission member only after a defined path. In practice, this shifts the point of initiation for the controlling of the adjustable damping valve. Alternatively or in conjunction therewith, the tension rod can have a spring arrangement which acts as a geardown device for gearing down the stabilizer movement to the transmission member. The stabilizer force or stabilizer path is reduced as a parameter for the change in damping force. The tension rod can also have a stop for the stabilizer movement. The provision of a stop limits the influence of the stabilizer on the increase in damping force.

In still another embodiment of the invention, the tension rod has a multiple-part spring arrangement with at least two springs with different spring constants or spring rates which are arranged in series. The spring with the greater spring force defines a threshold force for the damping valve control.

As an alternative or in conjunction with the spring arrangement for controlling the adjustable damping valve via the stabilizer, the control of the adjustable damping valve can be effected by means of an actuating rod of a vehicle brake, wherein the vibration damper has additional damping valves whose damping action is independent of the control by the actuating rod. A reaction force of the brake system is used in the braking process and this braking force is transmitted to the damping valve with adjustable damping force. In a further embodiment, the actuating rod carries out a controlling force or controlling path in one direction and is run clear in the other movement direction. The clearing makes possible the free path of the actuating rod during cornering without a braking process. Otherwise, the adjusting movement of the stabilizer would act on the actuating rod via the damping valve.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
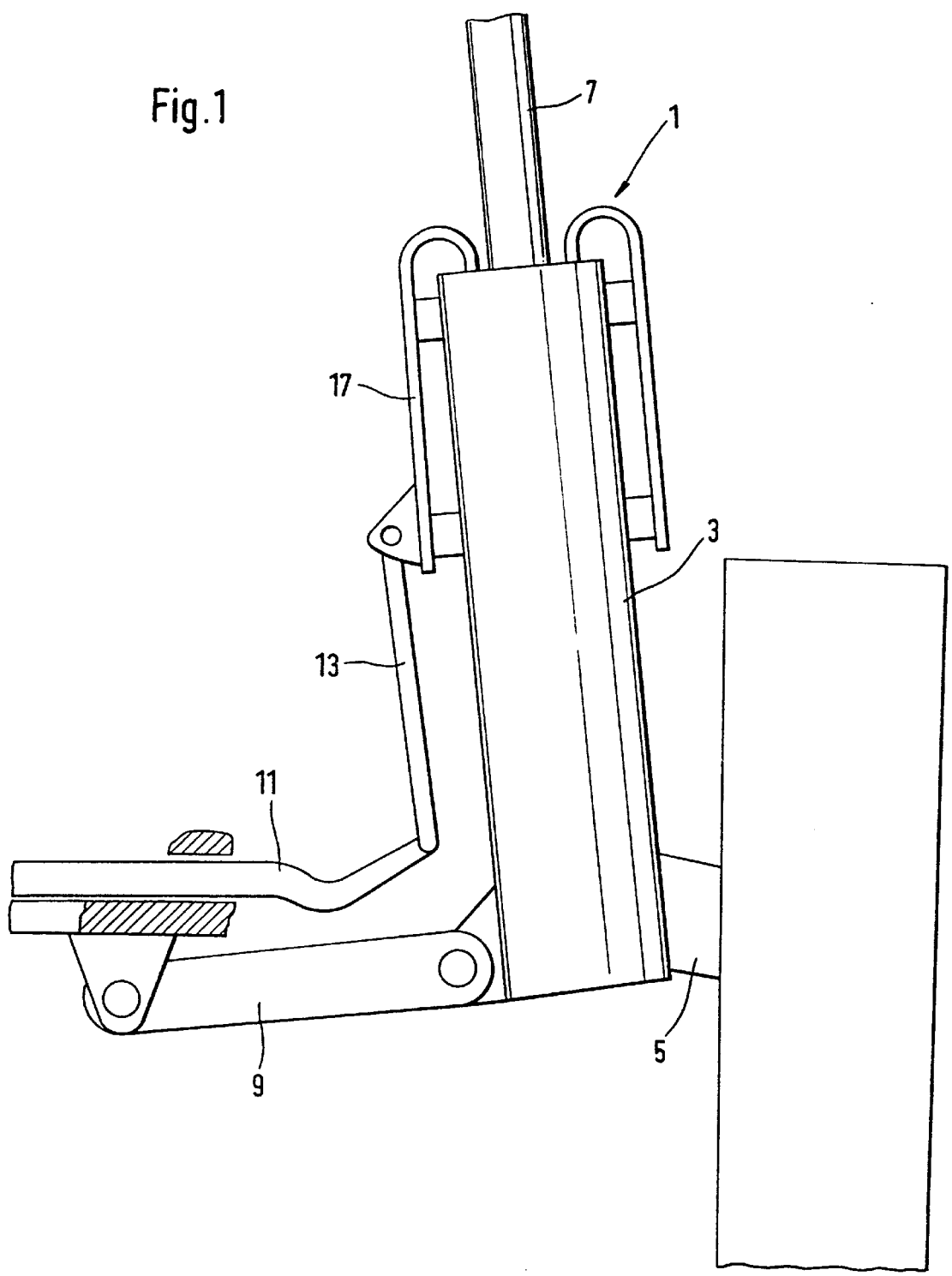
FIG. 1 shows a stabilizer connected to the vibration damper of the present invention.

FIG. 1 shows a vibration damper 1 in highly simplified form constructed as an axle damper. A wheel carrier 5 is connected to a cylinder 3 of the vibration damper 1, wherein a vehicle body, not shown, is supported at a piston rod 7. A vehicle axle 9 comprises a stabilizer 11 which alters the damping force of a damping valve 15 (FIG. 2) via a tension rod 13.

Figure 2:
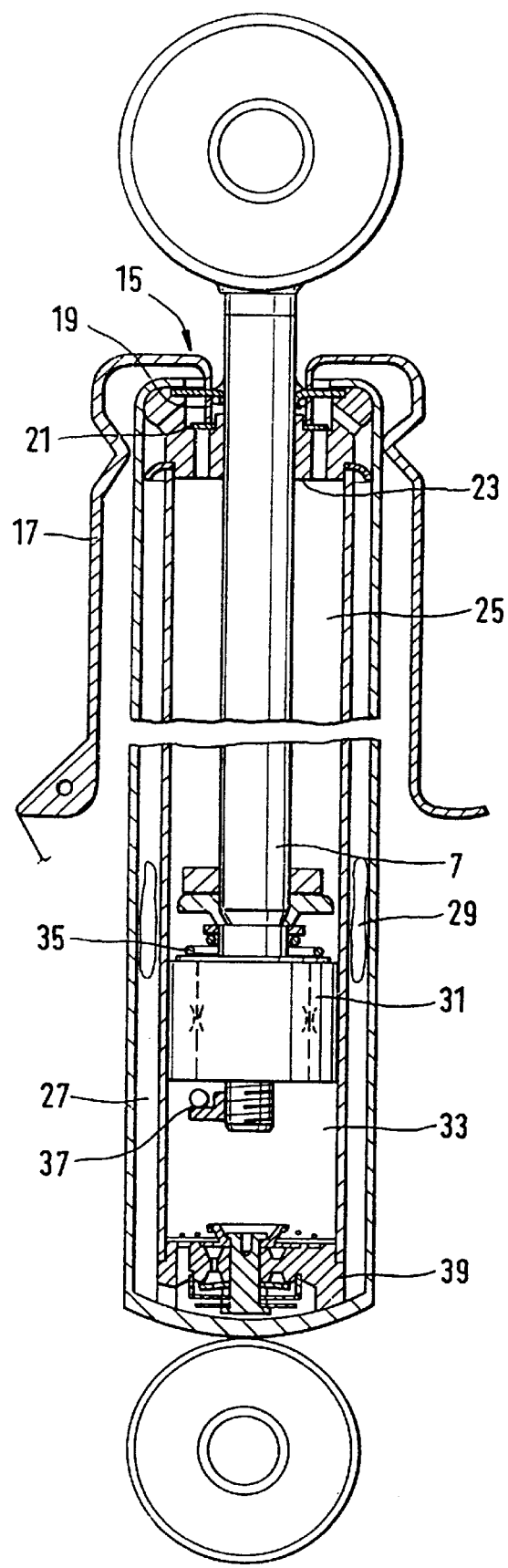
FIG. 2 shows an embodiment of the vibration damper.

During a rolling motion of the vehicle, the tension rod 13 is actuated by the stabilizer 11; wherein the tension rod 13 has an adjusting force and an adjusting path. This adjusting force and adjusting path are transmitted to the damping valve 15 which is shown in FIG. 2. The specific construction of the damping valve is not relevant for the present invention. Of principle importance is that the tension rod 13 acts on a transmission member 17 which in turn controls a valve plate 21 within a piston rod guide 23 via an intermediate sleeve 19. The piston rod guide 23 allows a damping medium to flow out of an upper work space 25 into a compensation space 27. There is a gas bubble 29 inside the compensation space 27 in order to prevent foaming of the damping medium.

The upper work space 25 is separated from a lower work space 33 by a piston 31 mounted on the piston rod 7. Additional damping valves 35, 37 are arranged inside the piston 31 which produce a connection between the work spaces 25, 33. A further damping valve 39 is arranged at the bottom of the lower work space 33 and acts during overflowing of the compensation space 27. The additional damping valves 35, 37, 39 generate a damping force independent from rolling movement.

Figure 3:
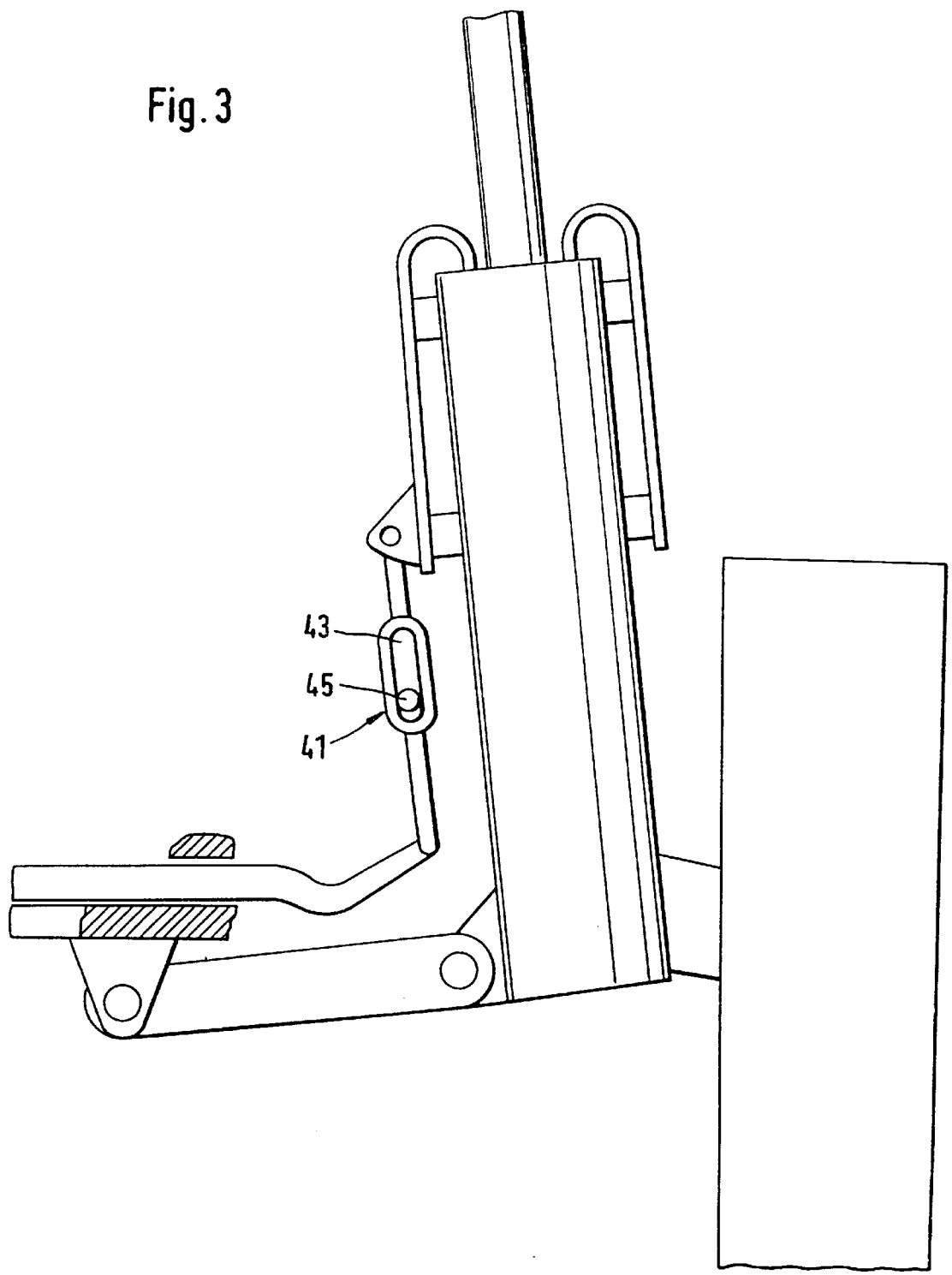
FIGS. 3, 4 and 5 show different embodiments for the connection.

FIG. 3 shows a construction of the invention in which the tension rod 13 has a free path 41. This free path comprises an elongated hole 43 as a guide in which a pin 45 is arranged so as to be movable axially. The free path 41 enables a path-offset initiation point of the change in damping force in the vibration damper 1.

Figure 4:
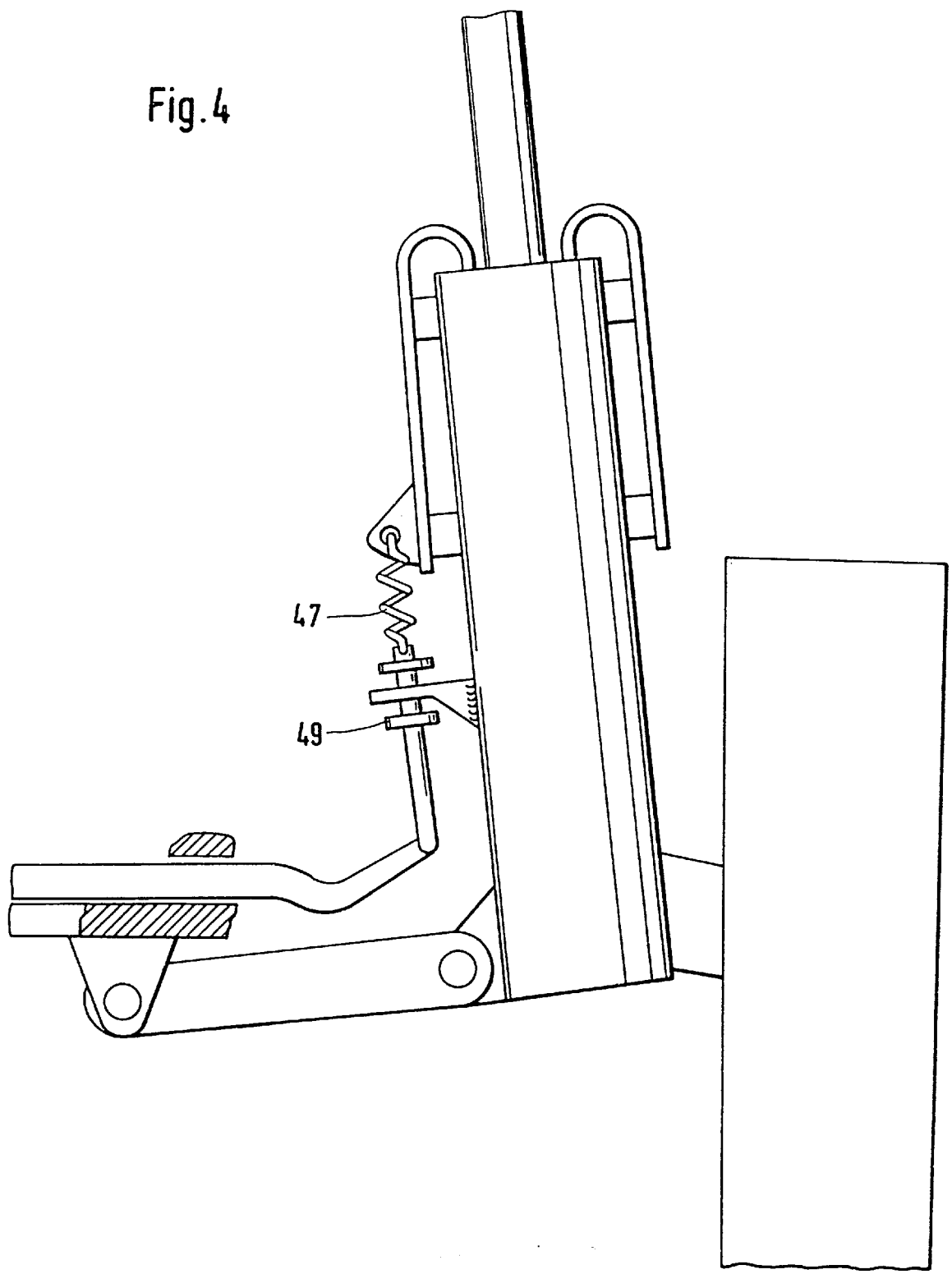

FIG. 4 shows a further development of the construction according to FIG. 3. Here, a spring arrangement 47 is connected with the tension rod 13. This spring arrangement 47 no longer transmits the stabilizer force directly to the damping valve 15, but rather, in practice, acts as a path reducer or, in other words, as a gear reduction. Further, the tension rod has a stop 49 which limits the effect of the stabilizer 11 on the damping valve 15.

Figure 5:
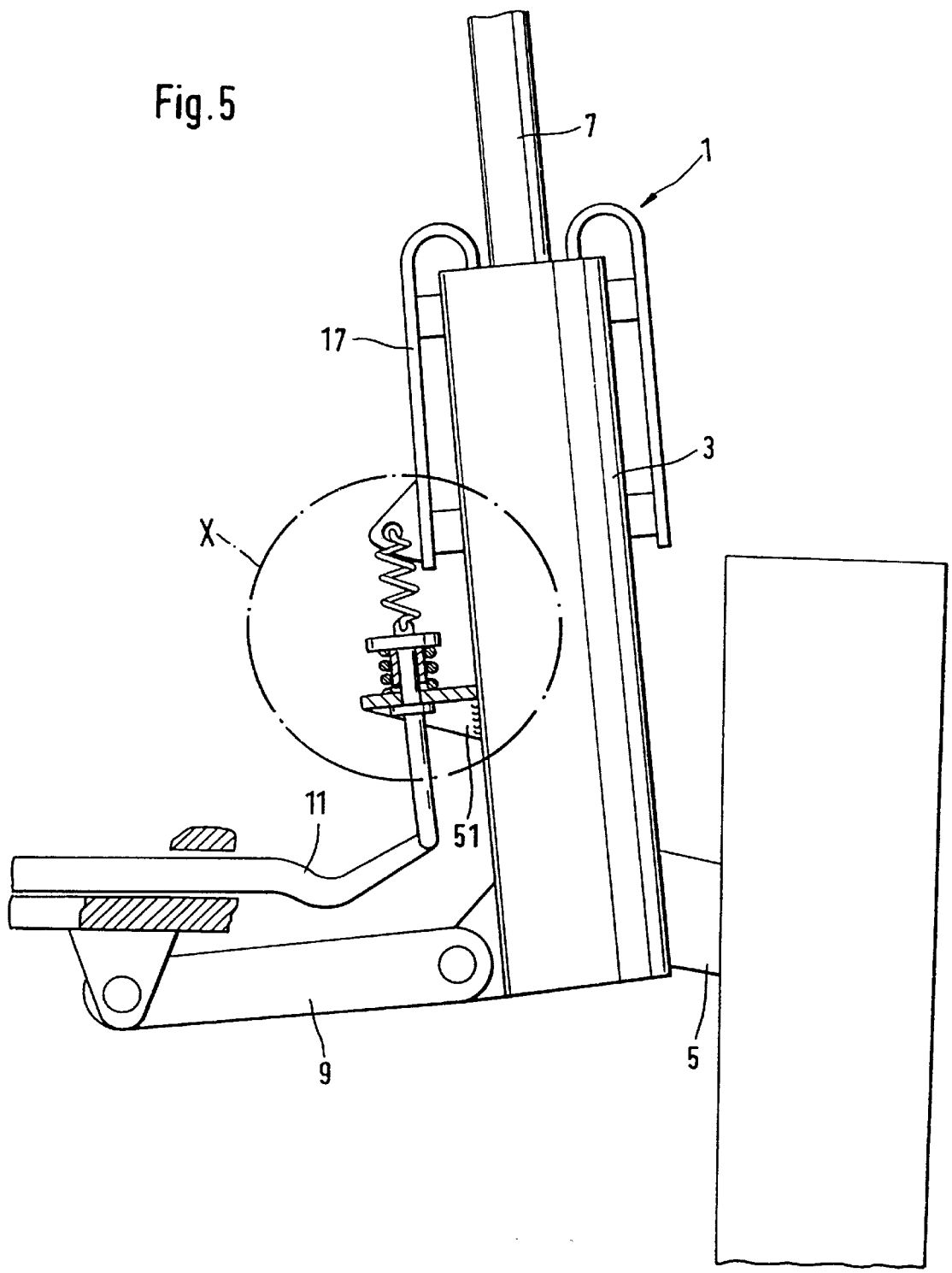
Figure 6:
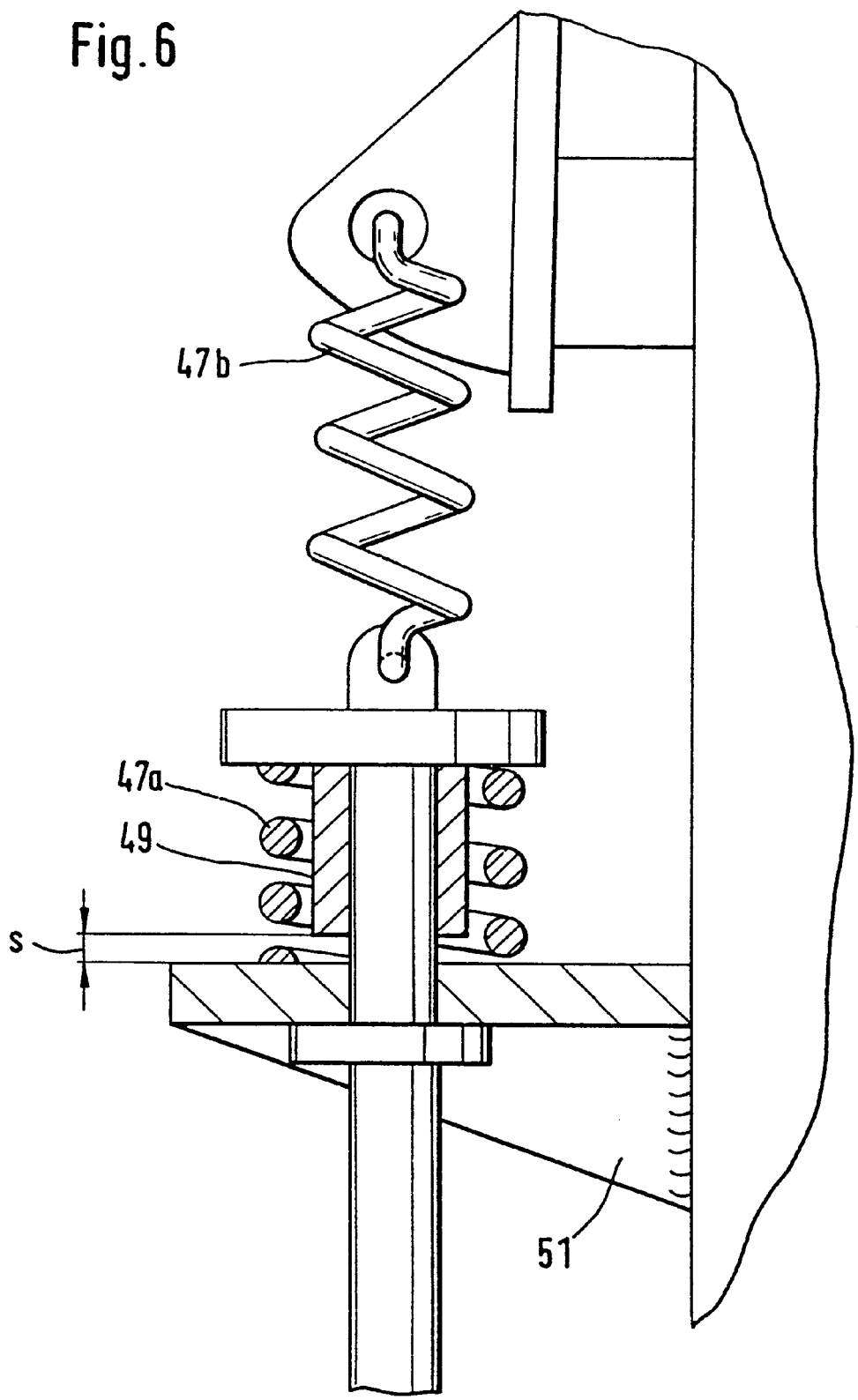
FIG. 6 is a detailed view X of the connection in FIG. 5.

A special spring arrangement 47 is shown in FIGS. 5 and 6. As is shown in FIG. 6 as an enlarged section view, the spring arrangement is formed of two springs 47a, 47b. When comparing the two springs, one spring 47b has an appreciably lower spring rate than the other spring 47a which is supported at a support plate 51 of the vibration damper 1 and accordingly opposes the stabilizer force with a force threshold in a compensating manner. The spring 47b, which is arranged in series, is loaded by a smaller tensile force which is then transmitted to the damping valve 15 (FIG. 2). This embodiment likewise has a stop 49 which defines an adjustment path s of the stabilizer 11 or of the tension rod 13.

Figure 7:
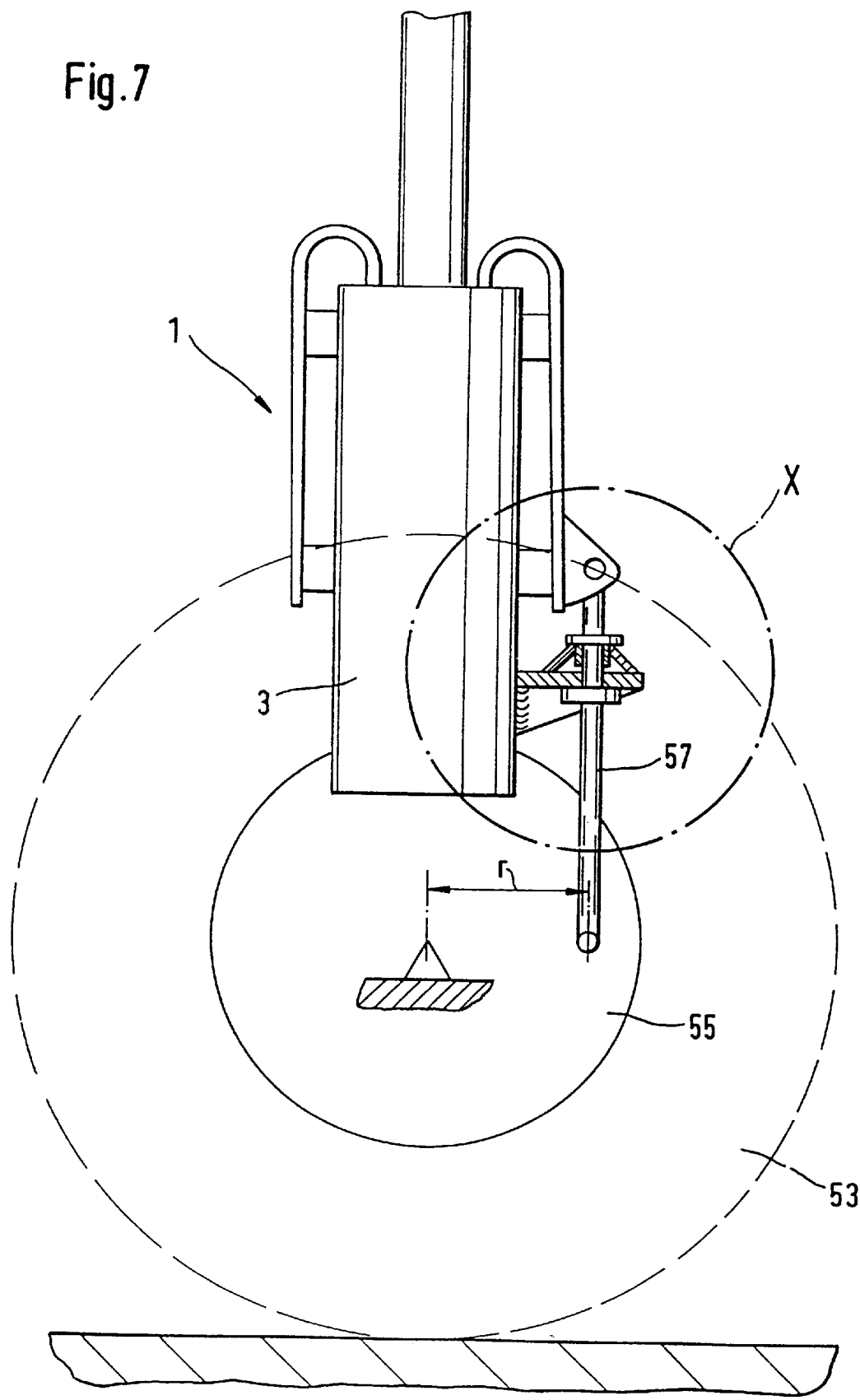
FIG. 7 shows a braking device with a connection to the vibration damper.

FIG. 7 shows a side view of a vehicle wheel 53 with an actuating rod 57 associated with a vehicle brake 55, shown in simplified form. The actuating rod 57 communicates with the vehicle brake 55 in a working connection. During a braking process, the supporting moment for the frictional force of the brake is transmitted to the actuating rod 57, so that the actuating rod executes an adjustment path which controls the changeable damping valve 15 (FIG. 2).

Figure 8:
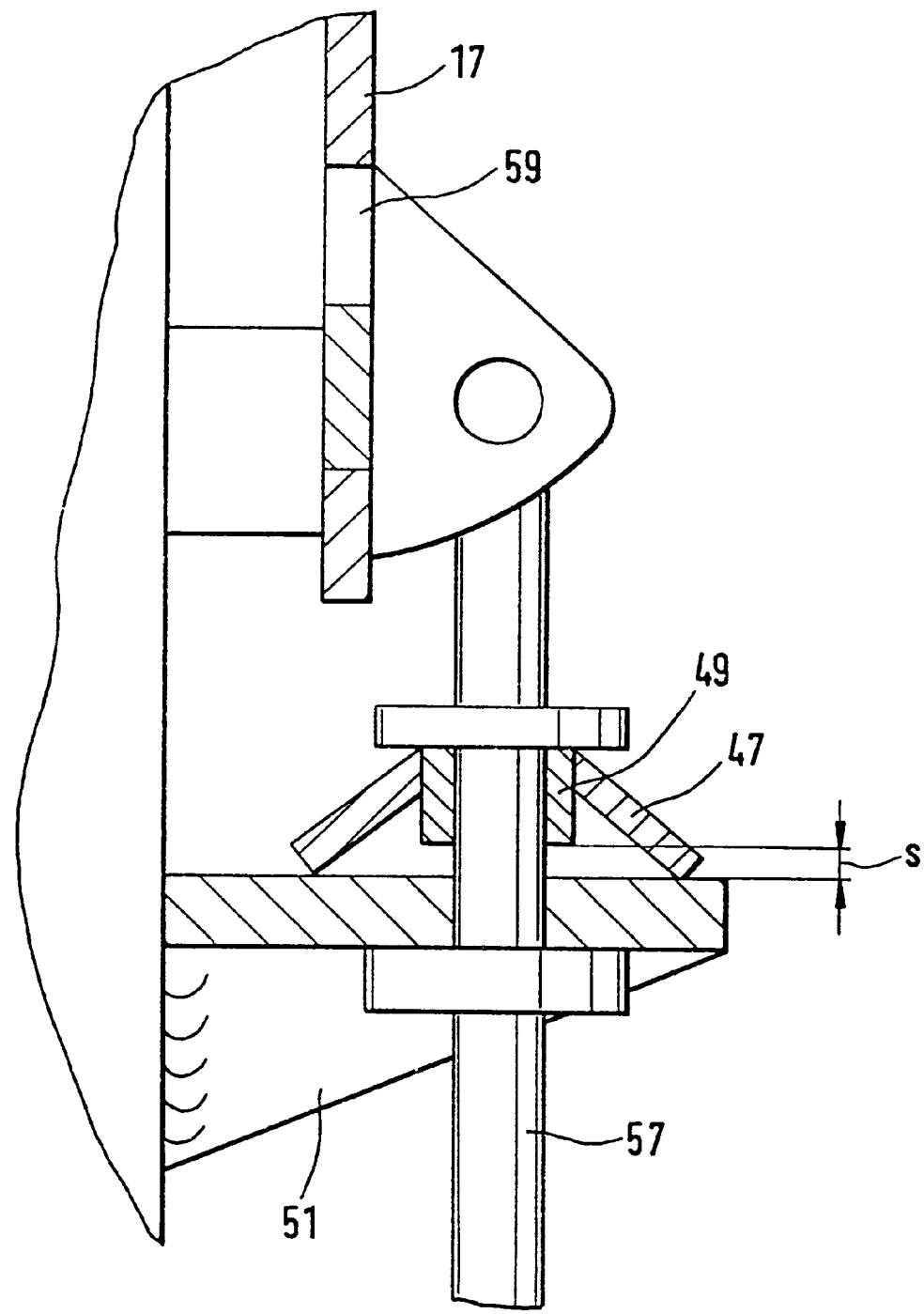
FIG. 8 shows a detailed X of the connection in FIG. 7.

FIG. 8 shows a detailed view of the path transmission to the vibration damper 1. It can be seen from the detailed view that the actuating rod 57 runs clear relative to the transmission sleeve 17 by means of an elongated hole 59 in the pressing direction of the transmission sleeve. This step makes it possible to combine the constructions according to FIGS. 1 to 6 with the variant according to FIGS. 7 to 8. Also to be taken into account is the case in which the vehicle executes a rolling movement when cornering without actuation of the brakes, wherein it should be ensured that the pressing movement of the transmission sleeve is not transmitted to the brake via the actuating rod. In FIG. 8, the spring 47 is in the form of a plate spring.

The invention is not limited by the embodiments described above which are presented as examples only but can be modified in various ways within the scope of protection defined by the appended patent claims.

I claim:

1. A vibration damper with variable damping force, comprising:

a cylinder;

a piston and a piston rod arranged in the cylinder so as to be axially movable;

an adjustable damping valve connected between the cylinder and the piston rod, and controlled as a function of a spring deflection path;

a stabilizer operatively connected to the adjustable damping valve so as to control the adjustable damping valve;

additional damping valves arranged to have a damping effect independent from the control by the stabilizer;

a tension rod connected to the stabilizer; and a transmission member connected between the tension rod and the adjustable damping valve.

2. A vibration damper according to claim 1, wherein at least one of the additional damping valves is arranged at the piston.

3. A vibration damper according to claim 1, wherein at least one of the additional damping valves is constructed as a bottom valve.

4. A vibration damper according to claim 1, wherein the tension rod is configured to have a free path which allows movement of the stabilizer to be transmitted to the transmission member only at an end of a defined path.

5. A vibration damper according to claim 4, wherein a stop is mounted on the tension rod so as to limit stabilizer movement.

6. A vibration damper according to claim 1, wherein the tension rod includes spring means for gearing down stabilizer movement to the transmission member.

7. A vibration damper according to claim 6, wherein a stop is mounted on the tension rod so as to limit stabilizer movement.

8. A vibration damper according to claim 6, wherein the spring means includes at least two springs with different spring rates which are arranged in series, the spring with a greater spring force defining a threshold force for the damping valve control.

* * * * *